United States Patent [19]
Lee et al.

[11] Patent Number: 5,923,670
[45] Date of Patent: Jul. 13, 1999

[54] MULTI-PORT TYPE UNIVERSAL ASYNCHRONOUS RECEIVER/ TRANSMITTER SYSTEM USING TIME DIVISION SYSTEM

[75] Inventors: Ig-Yong Lee, Gunpo; Yong-Woo Park, Suwon, both of Rep. of Korea

[73] Assignee: Samsung Electronics Co., Ltd., Kyungki-do, Rep. of Korea

[21] Appl. No.: 08/841,600

[22] Filed: Apr. 30, 1997

[30] Foreign Application Priority Data

Jun. 12, 1996 [KR] Rep. of Korea .................. 21061/1996

[51] Int. Cl.$^6$ ..................................................... H04J 3/00
[52] U.S. Cl. ........................... 370/521; 370/477; 370/280; 370/279
[58] Field of Search ..................................... 370/280, 279, 370/477, 521, 419, 420, 421, 542, 544, 537, 540

[56] References Cited

U.S. PATENT DOCUMENTS 5,799,208 8/1998 Hwang et al. ........................... 395/858

*Primary Examiner*—Jeffery A. Hofsass
*Assistant Examiner*—Mitchell Slavitt
*Attorney, Agent, or Firm*—Sughrue, Mion, Zinn, Macpeak & Seas, PLLC

[57] ABSTRACT

A multi-port universal asynchronous receiver/transmitter (UART) system is disclosed having time division multiplexing and demultiplexing. The system has plural UART's and includes a time slot generating unit for generating time slot signals corresponding to defined time slots which correspond in number to the plurality of UART's. A receiving data separating unit separates a single stream of received data into a plurality of receiving data streams to correspond with the time slots. Plural receiving data control units time expand respective ones of the separated receiving data streams. The UART's each receive a respective one of the time expanded receiving data streams and output them to an appliance, such as a computer. The UART's also receive data, from the appliance, for transmission. Plural transmitting data control units each receive a stream of transmitting data from a respective one of the plurality of UART's. The transmitting data control units each time compress their respective data streams and align the compressed data bits with a corresponding time slot. A transmitting data coupling unit receives the compressed data bits from the transmitting data control units and couples them into a single data line. The disclosed multi-port UART system is capable of using a single transmitting line and a single receiving line, thereby reducing the cost of the appliance due to simplification of circuitry and reducing cost of system installation due to a reduction in the number of transmitting and receiving lines.

5 Claims, 16 Drawing Sheets

MULTI-PORT TYPE UNIVERSAL ASYNCHRONOUS RECEIVER/ TRANSMITTER SYSTEM USING TIME DIVISION SYSTEM

BACKGROUND OF THE INVENTION

1. Field of the Invention

The present invention relates to a universal asynchronous receiver/transmitter system using a time division system. More particularly, the present invention relates to a multi-port type universal asynchronous receiver/transmitter (UART) system using a time division system. The present multi-port type UART system application is based on Korean Patent Application No. 21061/1996 which is incorporated herein for all purposes.

2. Description of the Related Art

Typically, UART's operate independently. In the case of a conventional UART system having a plurality of UART's, the system has a plurality of independent input/output ports. As the number of UART's increases, the number of input/output ports increases correspondingly. For this reason, UART systems using a plurality of UART's involve a complexity in circuit configuration and a requirement of a number of transmission lines. Due to the complexity in circuit configuration, such UART systems become bulky. The requirement of a number of transmission lines results in an increase in installation costs.

Therefore, conventional UART's having a plurality of input/output ports have a drawback in that an increase in costs occurs due to the requirement of plural independent input/output portions and corresponding plural independent transmission lines for each of the input/output ports.

SUMMARY OF THE INVENTION

Therefore, an object of the invention is to provide a multi-port type UART system using a time division system which is capable of using a single transmitting/receiving line, thereby reducing the cost of the UART system, as well as installation costs for the system.

In accordance with the present invention, this object is accomplished by providing a multi-port type universal asynchronous receiver/transmitter (UART) system using a time division system which has a plurality of universal asynchronous receiver/transmitter units and a time slot generating unit for generating time slot signals corresponding in number to the plurality of universal asynchronous receiver/transmitter units. The UART system has a receiving data separating unit for separating receiving data into a plurality of receiving data streams which correspond to the time slot signals, and a plurality of receiving data control units, each of said receiving data control units receiving one of the receiving data streams and time expanding data in the respective receiving data stream. Each of the universal asynchronous receiver/transmitter units is connected to receive the time expanded data from a respective one of the receiving data control units and then transfer the time expanded data to an appliance, for example a computer. Additionally, each of the universal asynchronous receiver/ transmitter units is connected to receive transmitting data from the appliance to be output. The UART system also has a plurality of transmitting data control units, each of the plurality of transmitting data control units receiving the transmitting data output from the universal asynchronous receiver/transmitter units and time compressing portions of the received transmitting data to correspond to a respective one of the time slot signals. Furthermore, the UART system has a transmitting data coupling unit for receiving time compressed transmitting data from each of the plurality of transmitting data control units and coupling the time compressed transmitting data, received from the plurality of transmitting data control units, into a single data line.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Figure 1:
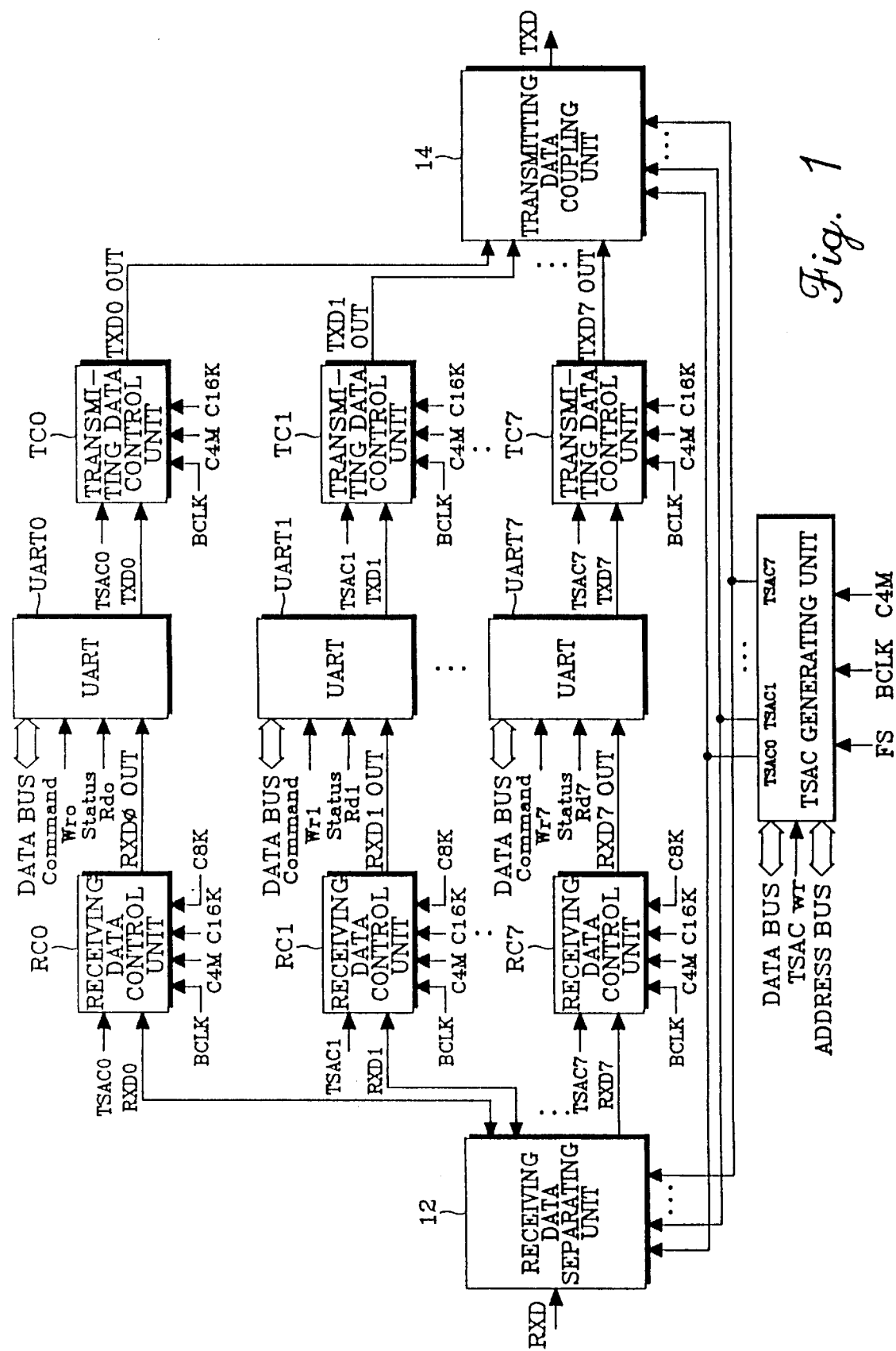
FIG. 1 is a block diagram illustrating a multi-port type UART system using a time division multiplexing in accordance with a preferred embodiment of the present invention.

FIG. 1 is a block diagram illustrating a multi-port type UART system using a time division system in accordance with a preferred embodiment of the present invention. As shown in FIG. 1, a receiving data separating unit 12 separates receiving data RXD into eight receiving data streams RXD0 to RXD7 which corresponding, respectively, to eight TSAC time slot signals. The TSAC signals serve as references for time intervals upon which separation of the RXD data received in the receiving data separating unit 12 is based. Such TSAC signals are generated from a TSAC generating unit 10 which includes eight time slot assignment circuits (TSAC's). The eight receiving data control units RC0 to RC7 receive the eight receiving data streams RXD0 to RXD7, respectively, from the receiving data separating unit 12. After time expanding the data RXD0 to RXD7, the receiving data control units RC0 to RC7 generate eight receiving data outputs RXD0 OUT to RXD7 OUT, respectively.

Eight UART's UART0 to UART7 are coupled to the eight receiving data control units RC0 to RC7 to receive the eight receiving data outputs RXD0 OUT to RXD7 OUT, respectively. Transmitting data streams TXD0 to TXD7 generated from the serial output ports of UART's UART0 to UART7 are applied, respectively, to eight transmitting data control units TC1 to TC7. The transmitting data control units TC1 to TC7 each compress the data input to them, thereby generating respective transmitting data outputs TXD0 OUT to TXD7 OUT. The transmitting data outputs TXD0 OUT to TXD7 OUT from the transmitting data control unit TC1 to TC7 are applied to a transmitting data coupling unit 14 which serves to couple together TXD0 OUT through TXD7 OUT to form TXD which is then output through a transmission line.

The receiving data RXD is a line of compressed data to be presented at ports at time intervals allocated by time slots generated in sync with successive frames. For these receiving data, the TSAC generating unit 10 allocates different time slots respectively associated with different ports. Accordingly, time intervals are allocated for portions of the receiving data RXD. Each time interval has a length of 2 BCLK clock periods (the BCLK rate being 2.048 MHz). In an allocated time interval, two bits of data are present.

In particular, eight receiving data streams RXD0 to RXD7 are input at every frame in accordance with the illustrated embodiment of the present invention. In this case, the multi-port type UART system, which uses a time division multiplexing, consists of eight UART's UART0 to UART7 which are adapted to process, respectively, the eight receiving data streams RXD0 to RXD7.

Eight TSAC signals TSAC0 to TSAC7 are used to denote time slots for dividing up the RXD data stream in order to separate the receiving data RXD into the eight receiving data streams RXD0 to RXD7. The eight TSAC signals TSAC0 to TSAC7 are generated by the TSAC generating unit 10. Since the TSAC generating unit 10 has a well-known configuration, the description of its detailed configuration and operation will be omitted.

All eight of the TSAC signals TSAC0 to TSAC7 are input to the receiving data separating unit 12, and to the transmitting data coupling unit 14. The TSAC signals TSAC0 through TSAC7 are also input to the respective receiving data control units RC0 to RC7, and to the respective transmitting data control units TC0 to TC7.

Figure 2:
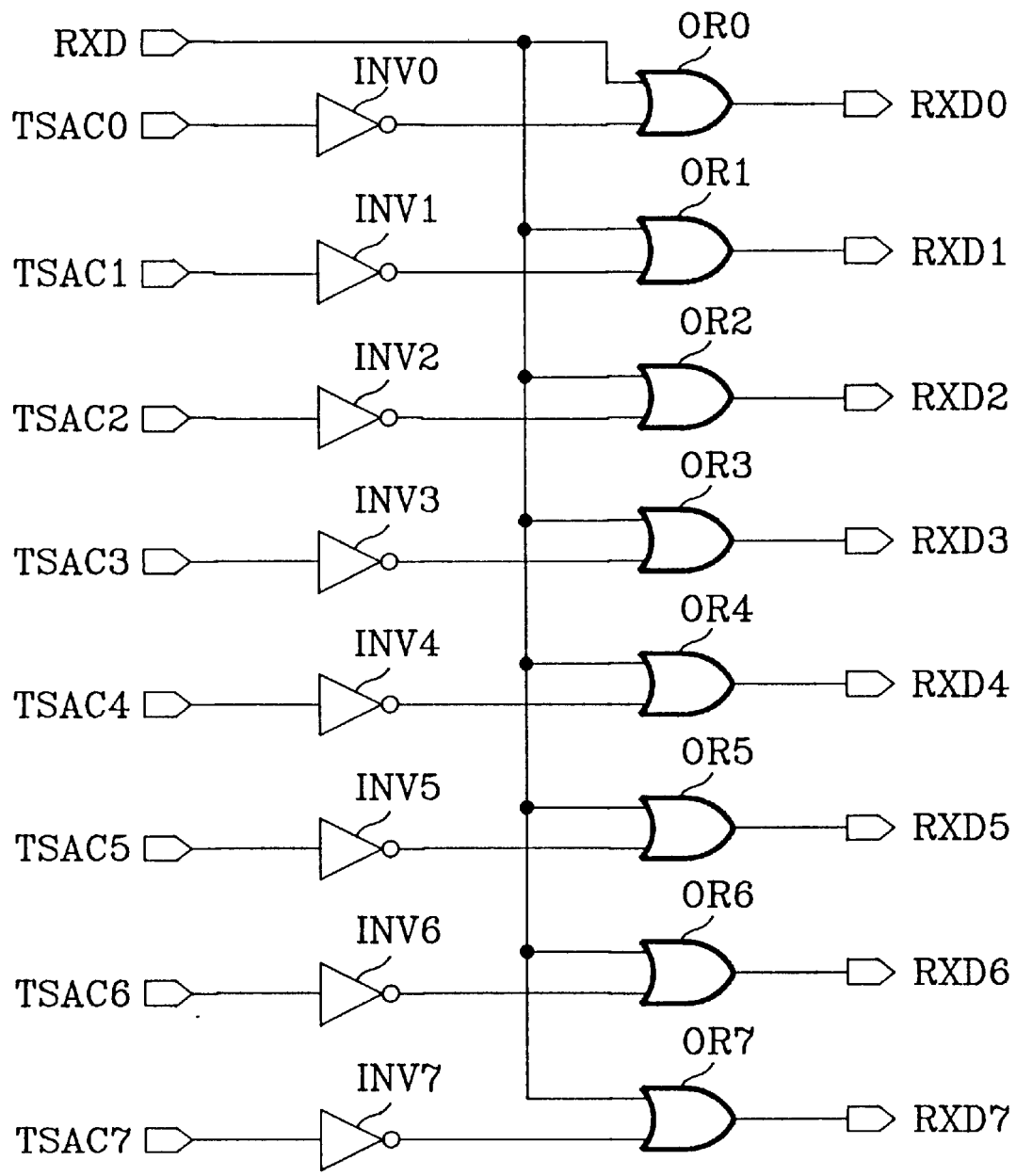
FIG. 2 is a circuit diagram illustrating a receiving data separating unit included in the system shown in FIG. 1.

Referring to FIG. 2, a detailed configuration of the receiving data separating unit 12 is illustrated. As shown in FIG. 2, the receiving data separating unit 12 has eight OR gates OR0 to OR7, and eight inverters INV0 to INV7. The OR gates OR0 to OR7 each receive the receiving data RXD at one input thereof. The other input of each of OR gates OR0 to OR7 receives an inverted version of a corresponding one of the eight TSAC signals TSAC0 to TSAC7, each of the eight TSAC signals having been inverted by one of the eight inverters INV0 to INV7. The TSAC0 to TSAC7 each have a high level during the time slots associated with the corresponding received data streams RXD0 to RXD7. Accordingly, the TSAC signals TSAC0 to TSAC7 upon being inverted by the inverters INV0 to INV7 become complemented for input to the OR gates OR0 to OR7, and thus, have a low level in their respective time slots.

Outputs from the OR gates OR0 to OR7 will be described using the OR gate OR0 as an example. The first inverter INV0 receives the first TSAC signal, TSAC0, which is in a high level in the time slot for the first receiving data RXD0, and inverts the first TSAC signal, TSAC0. The output from the first inverter INV0 is applied to the first OR gate OR0 which thereby receives the complement of the first TSAC signal, TSAC0. Accordingly, the output state of the first OR gate OR0 depends on the state of the first receiving data in the time slot for the first receiving data stream RXD0. In time slots other than the time slot for the first receiving data stream RXD0, the first OR gate OR0 outputs a high-level signal.

In this preferred embodiment, one frame of the first receiving data stream RXD0 occurs at a rate of 8 kHz and the width of one time slot is two BCLK clock periods. Two bits of data are input during each time slot. The clock rate of the BCLK is 2.048 MHz. As an example, assume that the first receiving data stream RXD0 is input during four sequential time slots as follows: "00", "11", "10", "11". Accordingly, the first receiving data stream RXD0 output from the receiving data separating unit 12 has sequential values of "00", "11", "10", and "11" in four sequential frames.

The whole received data processing procedure may be reviewed by analogy to the procedure of processing the first receiving data stream RXD0. Therefore, the detailed description of the procedure of processing receiving data streams RXD1 to RXD 7 will be omitted as being cumulative. For the convenience of the description, the value "1" of data is considered as a "high" level whereas the value "0" is considered as a "low" level.

UART's are typically adapted to receive data of 16 kHz. Accordingly, the separated data output from the data separating unit 12, which is at an 8 kHz rate, should be time expanded to form a data stream having a 16 kHz rate so that it can be received at the UART's at an appropriate data rate.

To this end, the first receiving data stream RXD0 is input to the first receiving data control unit RC0 to be expanded into RXD0 OUT before being received at the associated UART, UART0. In the first receiving data control unit RC0, the first receiving data stream RXD0 (at 8 kHz) is expanded to be RXD0 OUT at a rate of 16 kHz.

Figure 3:
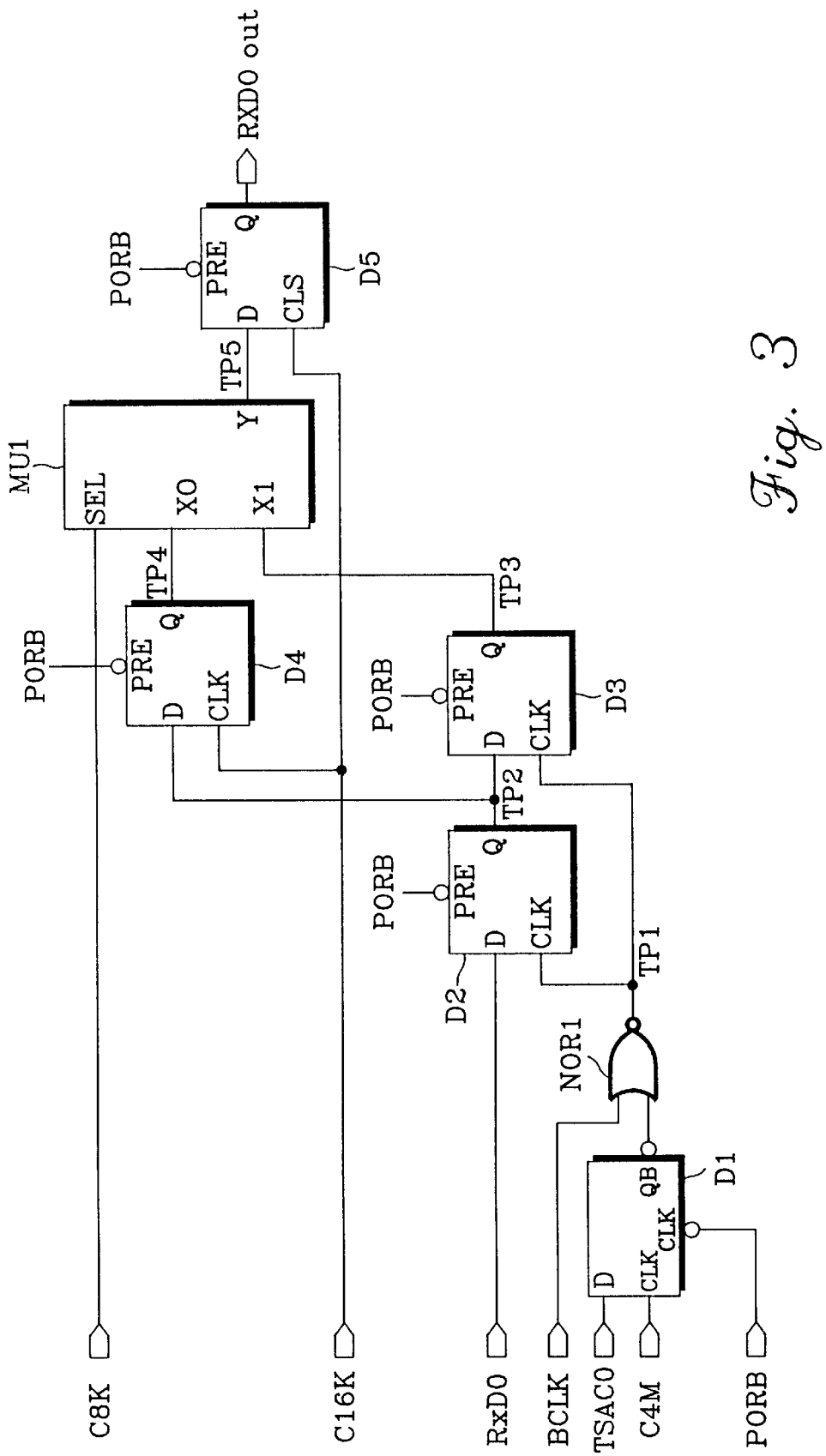
FIG. 3 is a circuit diagram illustrating a receiving data control unit included in the system shown in FIG. 1.

Referring to FIG. 3, a detailed configuration of the first data control unit RC0 is illustrated. As mentioned above, the first data control unit RC0 receives data of "00" at a first frame, data of "11" at a second frame, and data of "10" at a third frame.

The expansion of the data will now be described in detail in conjunction with the case wherein data of "00" is input at the first frame.

The first TSAC signal TSAC0 is first applied to the input terminal D of a first D-flip flop D1 shown in FIG. 3. The first TSAC signal TSAC0 is a signal which is at a high level in the time slot for the first receiving data stream RXD0.

On the other hand, a signal C4M is applied to the clock terminal of the first D-flip flop D1. The signal C4M is a clock signal of 4 MHz. A power-on reset signal PORB is also applied to the clear terminal CLR of the first D-flip flop D1.

The first D-flip flop D1 outputs the first TSAC signal TSAC0 at its inverting output terminal QB after delaying the first TSAC signal TSAC0 in accordance with the signal C4M. The output from the first D-flip flop D1 is applied to one input terminal of a first NOR gate NOR1 which also receives a signal BCLK at the other input terminal thereof.

The first NOR gate NOR1 outputs a high-level signal when both the inverted output from the first D-flip flop D1 and the signal BCLK are in a low state. In FIG. 3, the output from the first NOR gate NOR1 is denoted by the reference character "TP1". The signal TP1 is used as a clock signal for latching two bits of data when the first TSAC signal TSAC0 is generated. In other words, the signal TP1 is generated in the form of a signal having two clock pulses at the BCLK rate every time the first TSAC signal TSAC0 is generated.

Accordingly, the signal TP1 is exhibited in the form of two BCLK clock pulses at a time interval in which the first TSAC signal TSAC0 is generated. The signal TP1 is applied to respective clock terminals of second and third D-flip flops D2 and D3. The power-on reset signal PORB is applied to respective preset terminals PRE of the second and third D-flip flops D2 and D3. The second D-flip flop D2 receives the first receiving data stream RXD0 at its input terminal D. Accordingly, the second D-flip flop D2 sequentially outputs the two bits in a given time slot of the first receiving data stream RXD0. The output from the second D-flip flop D2 is denoted by the reference character "TP2" in FIG. 3. The first receiving data stream RXD0 applied to the second D-flip flop D2 at the first frame has bit values of "0" and "0". Therefore, the output TP2 from the second D-flip flop D2 has a value of "0" at the first positive edge of the signal TP1 and a value of "0" at the next positive edge of the signal TP1. This state of the signal TP2 is maintained because the signal TP1 is maintained in a low state until the first TSAC signal TSAC0 is generated again at the second frame.

The signal TP2 is applied to respective input terminals D of third and fourth D-flip flops D3 and D4.

The third D-flip flop D3 latches the signal TP2. As mentioned above, the signal TP1 is applied to both the clock terminals CLK of the second and third D-flip flops D2 and D3. Accordingly, the point of time when the signal TP2 exhibits the first bit, namely, "0", of the first receiving data stream RXD0 coincides with the point of time when the second D-flip flop D2 latches the first receiving data stream RXD0 at the first positive edge of the signal TP1. In the case of the third D-flip flop D3, however, it is meaningless to latch the signal TP2. This is because the signal TP2 does not exhibit the first receiving data stream RXD0 at the first positive edge of the signal TP1. In other words, the signal TP2 applied to the third D-flip flop D3 at the first positive edge of the signal TP1 is not the first receiving data stream RXD0.

On the other hand, the point of time when the signal TP2 exhibits the second bit, namely, "0", of the first receiving data stream RXD0 coincides with the point of time when the second D-flip flop D2 latches the first receiving data stream RXD0 at the second positive edge of the signal TP1. At the second positive edge of the signal TP1, the third D-flip flop D3 latches the signal TP2 exhibiting the first bit, namely, "0", of the first receiving data stream RXD0.

In this way, the second D-flip flop D2 sequentially latches two bits, namely, "0" and "0", of the first receiving data stream RXD0 generated at the first frame and maintains the second one, "0", of the two bits until the second frame of the first receiving data stream RXD0 is generated.

The third D-flip flop D3 latches the first bit, "0", of the first frame of the first receiving data stream RXD0. The latching operation of the third D-flip flop D3 is continued until the first receiving data stream RXD0 of the second frame is generated. At the second frame, the third D-flip flop D3 latches the second bit, "0", of the first receiving data stream TXD0 of the first frame. Subsequently, the third D-flip flop D3 latches the first bit, "1", of the first receiving data bit of the second frame and maintains the latched bit until the first receiving data of the third frame is generated.

The fourth D-flip flop D4 receives the output from the second D-flip flop D2, namely, the signal TP2, and latches the received signal TP2.

The signal TP2 applied to the fourth D-flip flop D4 is data of "00" which is indicative of a low state. The fourth D-flip flop D4 also receives a signal C16K at its clock terminal. The signal C16K is a 16 kHz clock signal. The fourth D-flip flop D4 is cleared when a power-on reset signal PORB is applied to its preset terminal PRE.

Accordingly, the fourth D-flip flop D4 sequentially outputs the receiving data "00" of the first frame at positive edges of the signal C16K. The output from the fourth D-flip flop D4 is denoted by the reference character "TP4" in the drawings. Since the signal TP2 is output in the form of the signal TP4 at the fourth D-flip flop D4 in a sequential manner, the bits of the first receiving data stream RXD0, namely, "00", are expanded to 16 kHz.

Meanwhile, the signals TP3 and TP4 are applied to a first multiplexer MU1. The first multiplexer MU1 also receives a signal C8K at its selector terminal SEL. The signal C8K is an 8 kHz clock signal. The first multiplexer MU1 outputs the signal TP3 when the signal C8K is in a high state. When the signal C8K is in a low state, the multiplexer MU1 outputs the signal TP4. The output from the multiplexer MU1 is denoted by the reference character TP5.

The first TSAC signal TSAC0 may be generated at a time slot optionally set at any phase point within the period of the 8 kHz clock signal C8K. Since the first multiplexer MU1 should sequentially output the first receiving data of successive frames, the point of time when the first TSAC signal TSAC0 is generated should not vary in accordance with the status (high or low state) of the signal C8K. In this connection, the operation of the first multiplexer MU1 will now be described in conjunction with the alternative cases wherein the first TSAC signal TSAC0 is generated during the high state of signal C8K and during the low state of the signal C8K.

First, the operation of the first multiplexer MU1 will be described in conjunction with the case wherein the first TSAC signal TSAC0 is generated in a high state of the signal C8K. In this case, the first multiplexer MU1 outputs the signal TP3. At this time, the signal TP3 exhibits the first bit, "0", of the first frame of the first receiving data stream RXD0.

While the first multiplexer MU1 outputs the signal TP3, the fourth D-flip flop D4 latches the first bit, "0", of the first frame of the first receiving data stream RXD0 at the positive edge of the signal C16K. At this time, however, the first bit of the first receiving data stream RXD0 of the first frame is not output from the first multiplexer MU1 because the first multiplexer MU1 is in a high state. The fourth D-flip flop D4 then latches the second bit, "0", of the first frame of the first receiving data stream RXD0 at the positive edge of the signal C16K. At this time, the signal C8K is inverted to a low state.

As a result, the first multiplexer MU1 outputs the signal TP4. As mentioned above, the fourth D-flip flop D4 outputs the second bit, "0", of the first frame of the first receiving data stream RXD0 at the positive edge of the signal C16K. Accordingly, the signal TP4 exhibits the second bit, "0", of the first receiving data stream RXD0 of the first frame.

In this way, the first multiplexer MU1 sequentially outputs two bits, "00", of the first receiving data stream RXD0 of the first frame.

Where the first TSAC signal TSAC0 is generated in a low state of the signal C8K, the first multiplexer MU1 operates as follows. That is, the first multiplexer MU1 outputs the signal TP4. At this time, the signal TP4 exhibits the second bit of the previous frame just preceding the above-mentioned first frame of the first receiving data stream RXD0.

While the first multiplexer MU1 outputs the signal TP4, the third D-flip flop D3 maintains the first bit, "0", of the first frame of the first receiving data stream RXD0. When the signal C8K is subsequently inverted to a high state, the first multiplexer MU1 outputs the signal TP3 which exhibits the first bit of the first frame of the first receiving data stream RXD0.

While the first multiplexer MU1 outputs the signal TP3, the fourth D-flip flop D4 latches the first bit, "0", of the first frame of the first receiving data stream RXD0 at the positive edge of the signal C16K. At this time, however, the first bit of the first frame of the first receiving data stream RXD0 is not output from the first multiplexer MU1 because the first multiplexer MU1 is in a high state, as mentioned above. The fourth D-flip flop D4 then latches the second bit, "0", of the first frame of the first receiving data stream RXD0 at the positive edge of the signal C16K. At this time, the signal C8K is inverted to a low state.

As a result, the first multiplexer MU1 outputs the signal TP4. As mentioned above, the fourth D-flip flop D4 outputs the second bit, "0", of the first frame of the first receiving data stream RXD0 at the positive edge of the signal C16K. Accordingly, the signal TP4 exhibits the second bit, "0", of the first frame of the first receiving data stream RXD0.

In this way, the first multiplexer MU1 sequentially outputs two bits, "00," of the first frame of the first receiving data stream RXD0.

The output signal from the first multiplexer MU1, namely the signal TP5, is applied to a fifth D-flip flop D5. This fifth D-flip flop D5 also receives the signal C16K. The fifth D-flip flop D5 latches and outputs the signal TP5 at the positive edge of the signal C16K. This output signal from the fifth D-flip flop D5 is denoted by the reference character "RXD0 OUT" in the drawings. The first receiving data output RXD0 OUT is applied to the first UART, UART0.

In this case, each bit of the first receiving data output RXD0 OUT has a length equal to one period of the 16 kHz clock C16K. The bits of the first receiving data output RXD0 OUT are sequentially output in the order of sequentially-input receiving data RDX irrespective of the state of the selector signal C8K for the first multiplexer MU1.

Figure 4:
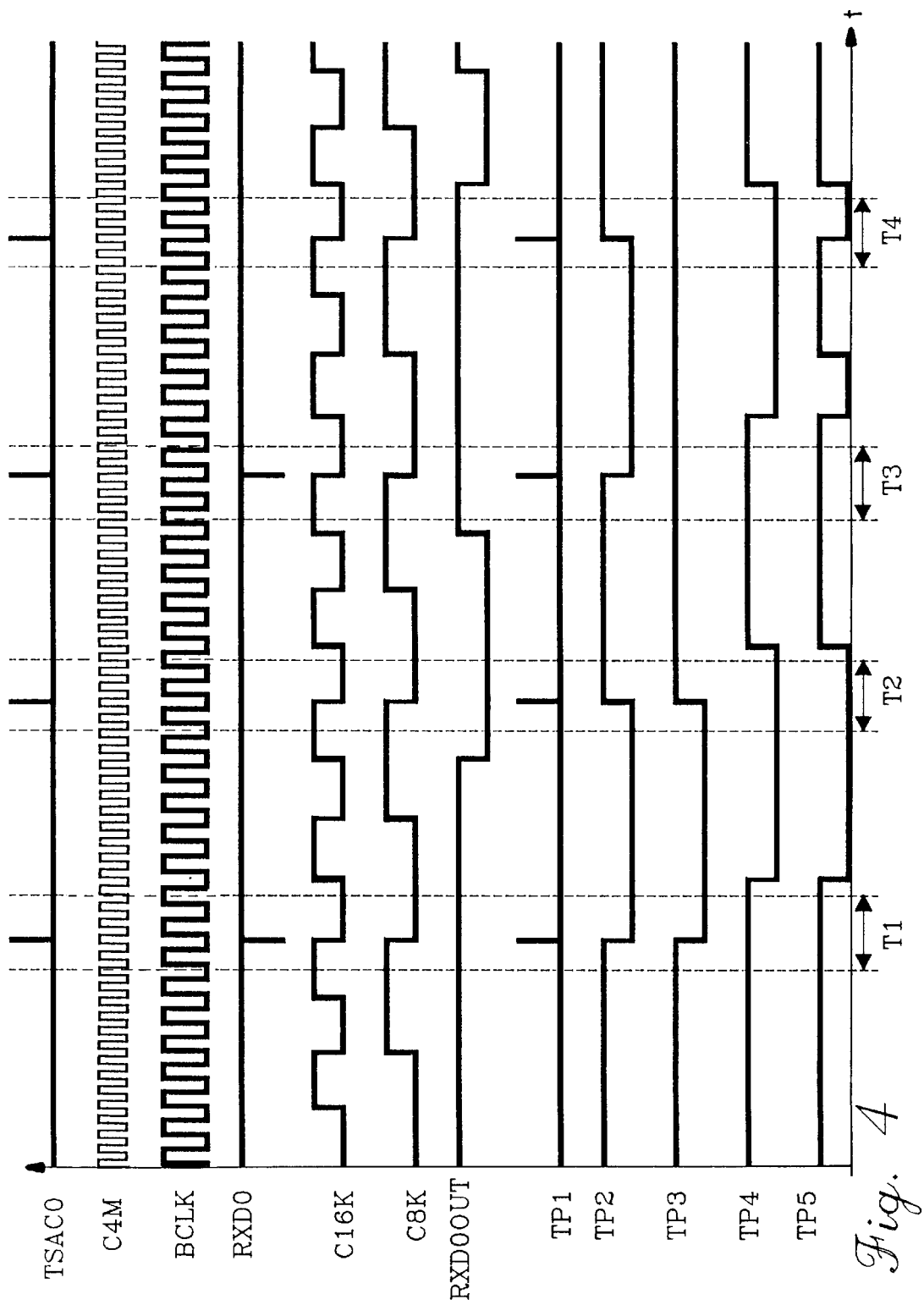
FIG. 4 is a wave form timing diagram illustrating the operation of the receiving data control unit.

Referring to FIG. 4, an operation timing diagram of the above-mentioned receiving data control unit RC0 is shown. The operation of the receiving data control unit RC0 shown in FIG. 4 is associated with the case wherein the first TSAC signal TSAC0 is generated in a low state of the signal C8K. Due to the fact that clock signals C4M and BCLK have frequencies substantially higher than the signals being illustrated in FIG. 4, the portrayal of these two wave forms are not drawn to time scale. For a more precise portrayal of the relative timing of C4M and BCLK to the other wave forms, reference should be made to detail FIGS. 5–8.

Figure 5:
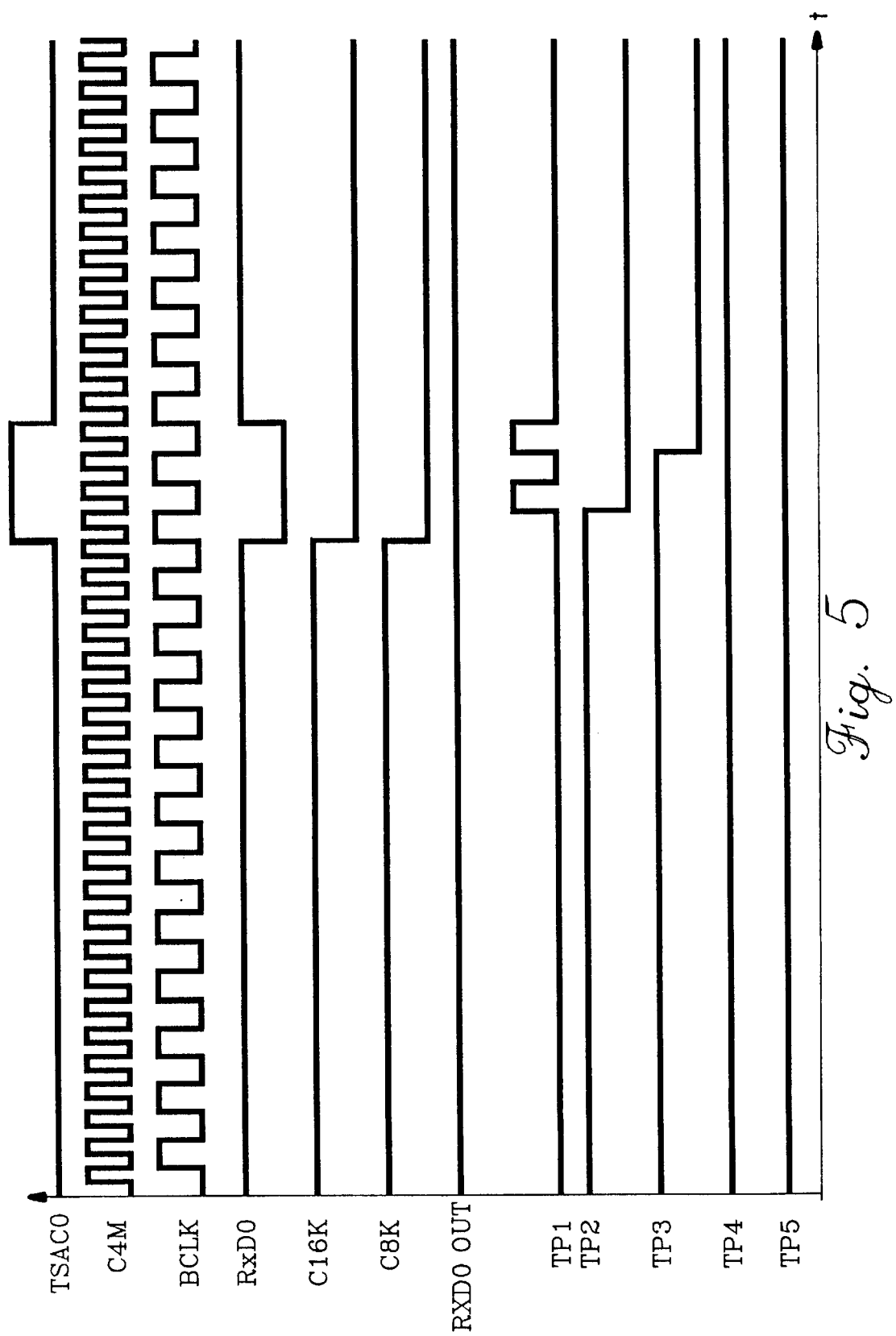
FIG. 5 is a wave form timing diagram showing a detail portion of FIG. 4 corresponding to time period T1, to illustrate the operation of the receiving data control unit.

In this case, the signal TP1 is generated at the point of time when the first TSAC signal TSAC0 is generated. At the first frame, the first receiving data stream RXD0 is input in the form of "00" at the receiving data control unit RC0. Referring to FIG. 5, a portion T1 of the first frame in which the first receiving data stream is exhibited is shown in detail.

Accordingly, the signal TP2 exhibits the first bit, "0", of the first frame at the first positive edge of the signal TP1. At the second positive edge of the signal TP1, the signal TP2 exhibits the second bit, "0", of the first frame. On the other hand, the signal TP3 latches the signal TP2 which exhibits the first bit; "0", of the first frame. The signal TP4 latches the signal TP2 at the positive edge of the signal C8K. In this state, the signal TP5 corresponds to the signal TP4 because the signal C8K is in a low state. At this time, prior to the low-to-high transition of C8K, the signal TP4 is associated with the previous frame just preceding the first frame. When the signal C8K is inverted to a high state, the signal TP5 corresponds to the signal TP3. That is, this signal TP5 exhibits the first bit, "0", of the first frame. When the signal C8K is subsequently inverted again to a low state, the signal TP5 corresponds to the signal TP4. That is, this signal TP5 exhibits the first bit, "0", of the first frame.

Meanwhile, the first receiving data output RXD0 OUT corresponds to the signal TP5 latched at the positive edge of the signal C16K. The first, low-level portion of the first receiving data output RXD0 OUT having a length of 0.125 ms (i.e., ⅛ kHz) exhibits the data "00" of the first frame. Thus, the data of one bit is extended to 16 kHz.

Figure 6:
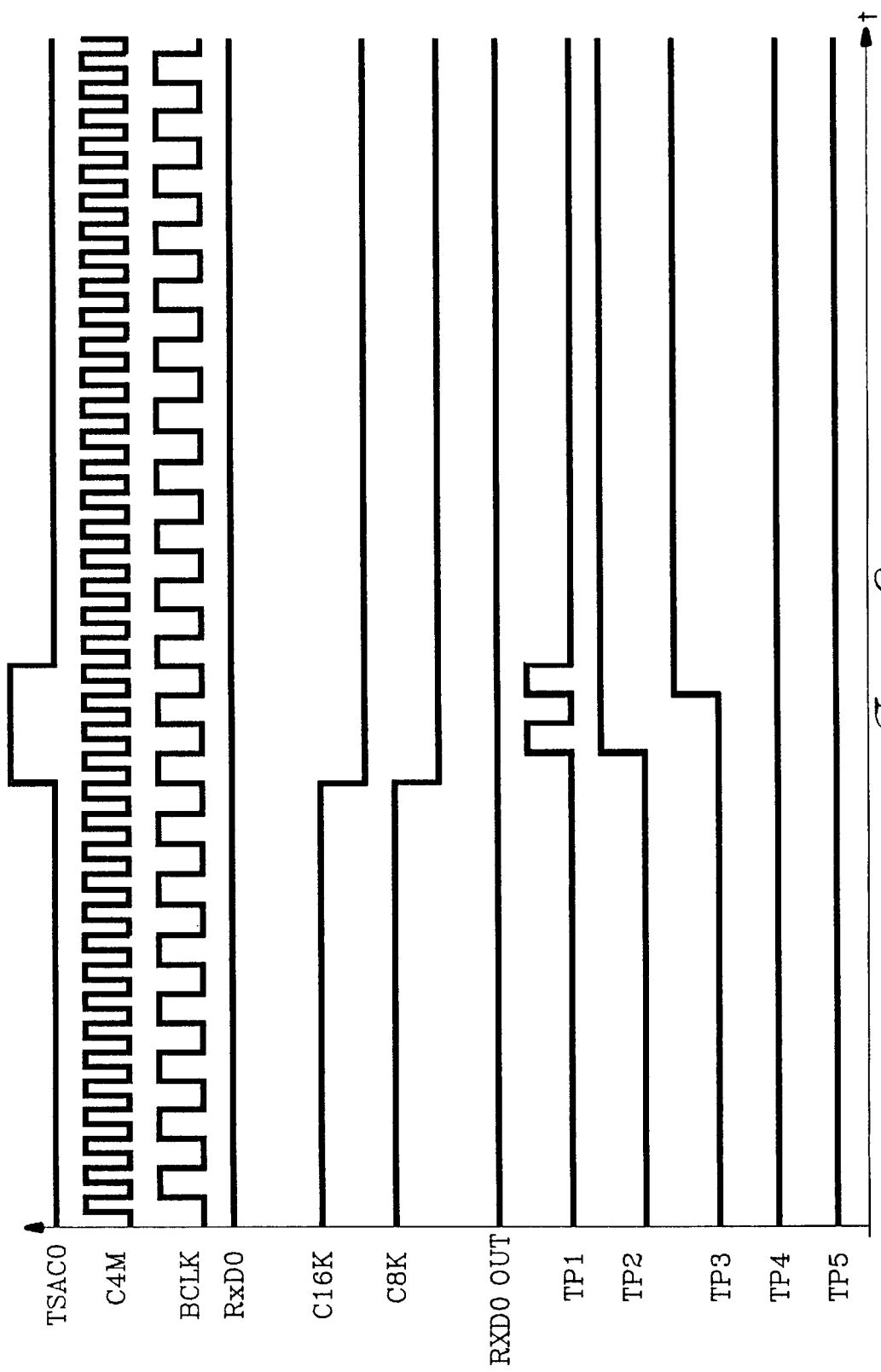
FIG. 6 is a wave form timing diagram showing a detail portion of FIG. 4 corresponding to time period T2, to illustrate the operation of the receiving data control unit.

At the second frame, the first receiving data stream RXD0 is input in the form of "11" (i.e., two high bits). Referring to FIG. 6, a portion T2 of the second frame in which the first receiving data is exhibited is shown in detail.

Accordingly, the signal TP2 exhibits the first bit, "1", of the second frame at the first positive edge of the signal TP1. At the second positive edge of the signal TP1, the signal TP2 exhibits the second bit, "1", of the second frame. On the other hand, the signal TP3 latches the signal TP2 which exhibits the first bit, "1", of the second frame. The signal TP4 latches the signal TP2 at the positive edge of the signal C8K. In this state, the signal TP5 corresponds to the signal TP4 because the signal C8K is in a low state. At this time, prior to the low-to-high transition of signal C8K, the signal TP4 is associated with the first frame. When the signal C8K is inverted to a high state, the signal TP5 corresponds to the signal TP3. That is, this signal TP5 exhibits the first bit, "1", of the second frame. When the signal C8K is subsequently inverted again to a low state, the signal TP5 corresponds to the signal TP4. That is, this signal TP5 exhibits the first bit, "1", of the second frame.

In this case, the first receiving data output RXD0 OUT corresponds to the signal TP5 latched at the positive edge of the signal C16K. The second, high-level portion of the first receiving data output RXD0 OUT, which follows the first, low-level portion and has a length of 0.125 ms (i.e., ⅛ kHz), exhibits the data "11" of the second frame. Thus, the data of one bit is expanded to 16 kHz.

Figure 7:
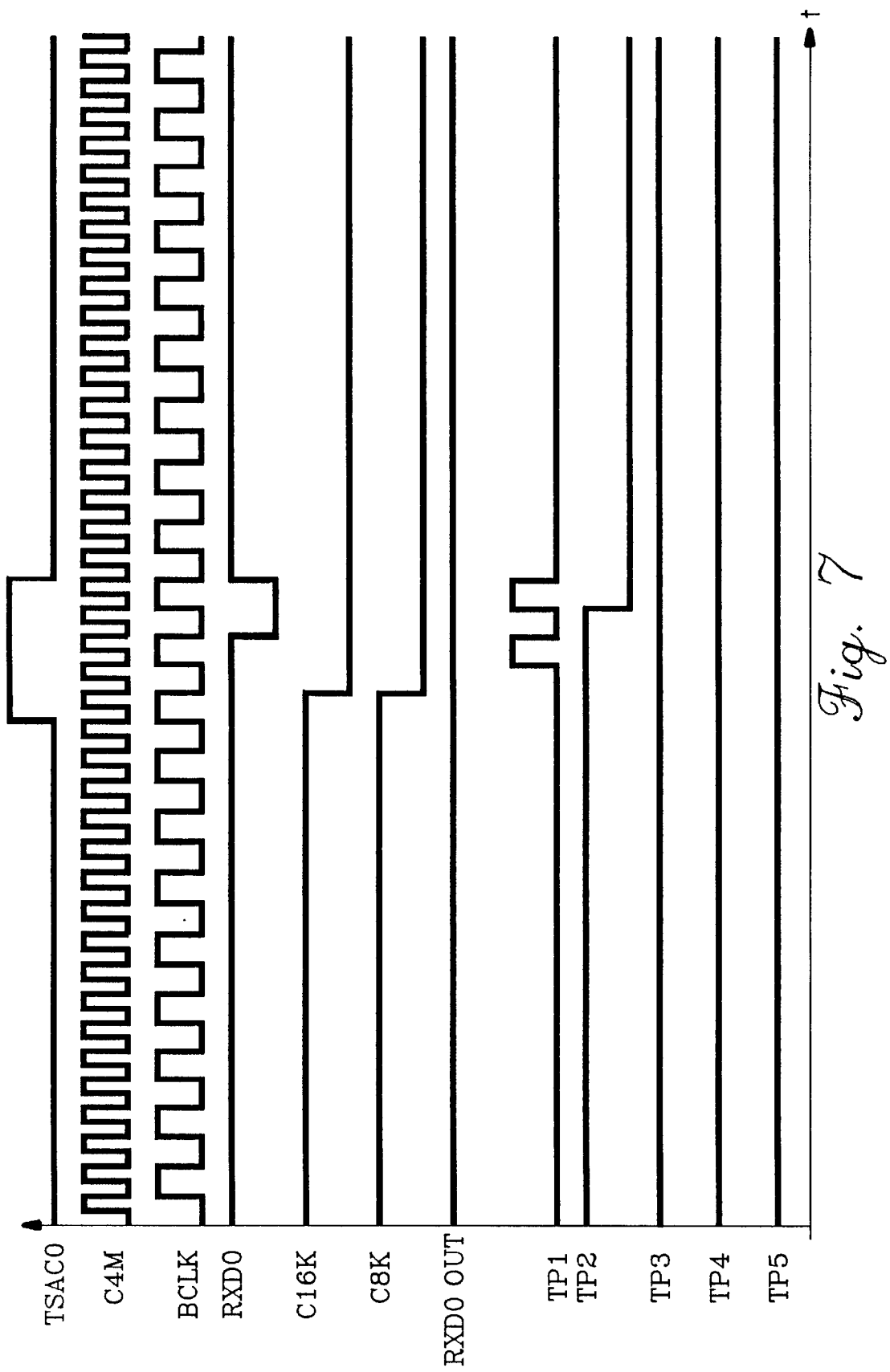
FIG. 7 is a wave form timing diagram showing a detail portion of FIG. 4 corresponding to time period T3, to illustrate the operation of the receiving data control unit.
Figure 8:
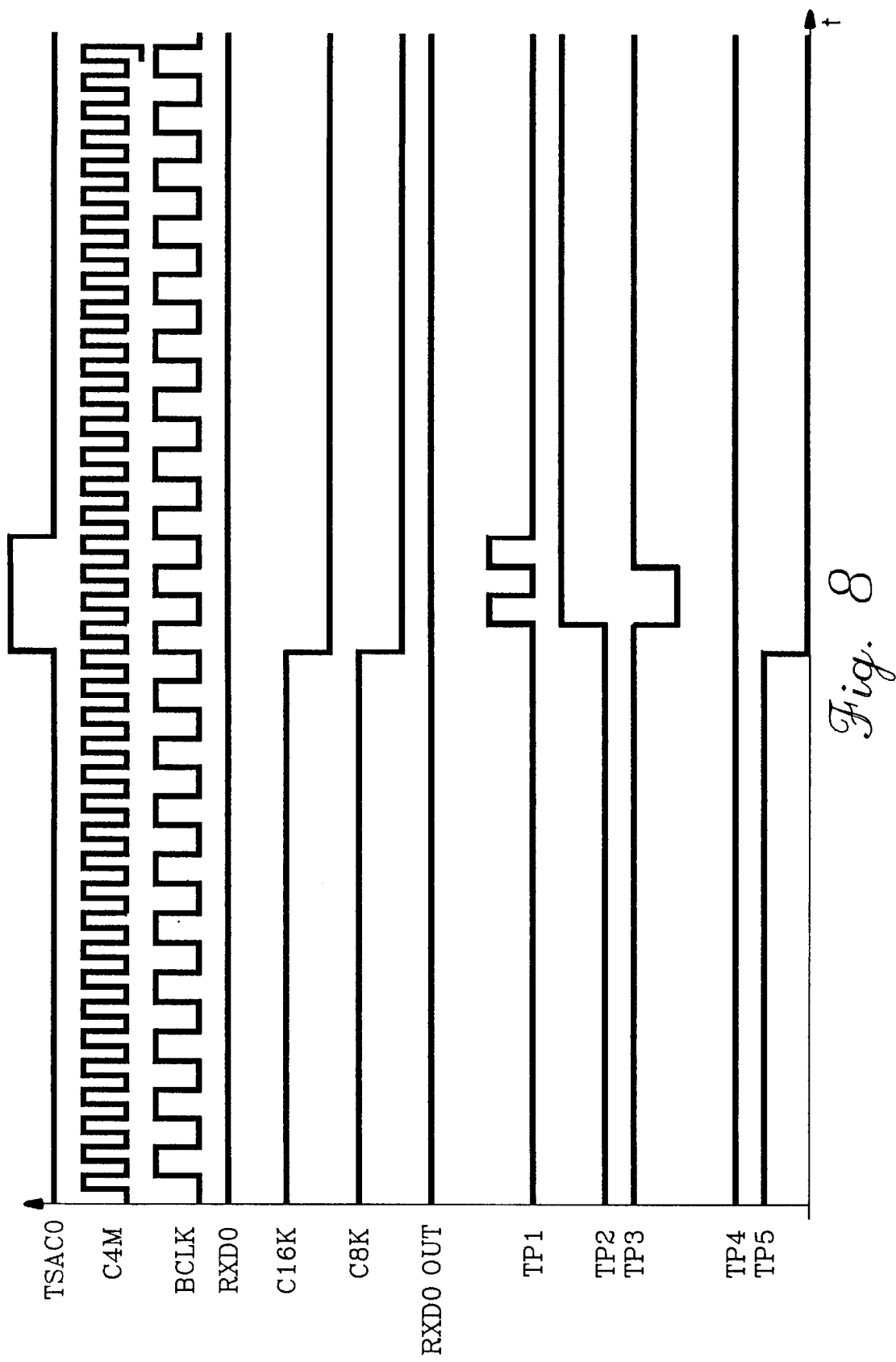
FIG. 8 is a wave form timing diagram showing a detail portion of FIG. 4 corresponding to time period T4, to illustrate the operation of the receiving data control unit.

On the other hand, the first receiving data stream RXD0 are input in the form of "10" and "11" at third and fourth frames, respectively. FIGS. 7 and 8 show in detail respective portions T3 and T4 of the third and fourth frames in which the first receiving data is exhibited.

As mentioned above, the first receiving data control unit RC0 outputs the first receiving data stream RXD0 which is expanded to 16 kHz. The remaining, second to eighth receiving data control units RC1 to RC7 carry out the same operation as the first receiving data control unit RC0. That is, the second to eighth receiving data control units RC1 to RC7 receive the second to eighth receiving data streams RXD1 to RXD7 and output second to eighth receiving data outputs RXD1 OUT to RXD7 OUT, respectively.

The first to eighth receiving data outputs RXD0 OUT to RXD7 OUT are applied to the first to eighth UART's UART0 to UART7, respectively, which store the data they receive. The UART's UART0 to UART7 are connected to an appliance, such as a computer or a generalized data terminal device. The appliance sends the first to eighth status read signals STATUS RD0 to STATUS RD7 to the first to eighth UART's UART0 to UART7, respectively. The appliance also sends the first to eighth command signals COMMAND WR0 to COMMAND WR7 to the first to eighth UART's UART0 to UART7, respectively, in order to read data from or write data to the UART's. In response to the command signals COMMAND WR0 to COMMAND WR7, the first to eighth UART's UART0 to UART7, respectively, transmit the first to eighth receiving data outputs RXD0 OUT to RXD7 OUT to the appliance via data buses, or receive the first to eighth transmitting data TXD0 to TXD7 from the appliance via the data buses.

When the first to eighth UART's UART0 to UART7 receive corresponding transmitting data TXD0 to TXD7, the received data is sent to the corresponding ones of first to eighth transmitting data control units TC0 to TC7. The transmitting data control units TC0 to TC7 compress the first to eighth transmitting data TXD0 to TXD7 into two bit packets of data and then output the compressed data by frames, respectively.

Now, the operation of processing the transmitting data TXD0 to TXD7 will be described based on the exemplary case wherein data values of "00111011" are input in a sequential manner from UART0 as the first transmitting data TXD0.

The procedure of processing transmitting data in data streams TXD1 through TXD7 may be understood by analogy to the procedure of processing the first transmitting data stream TXD0. Therefore, the detailed description of the procedure of processing transmitting data other than the first transmitting data TXD0 will be omitted as being cumulative.

As mentioned above, the first transmitting data TXD0 is compressed into two bit packets corresponding to every time slot. Specifically, a two bit packet of the first transmitting data TXD0 should have a length corresponding to two clock periods of the signal BCLK.

Figure 9:
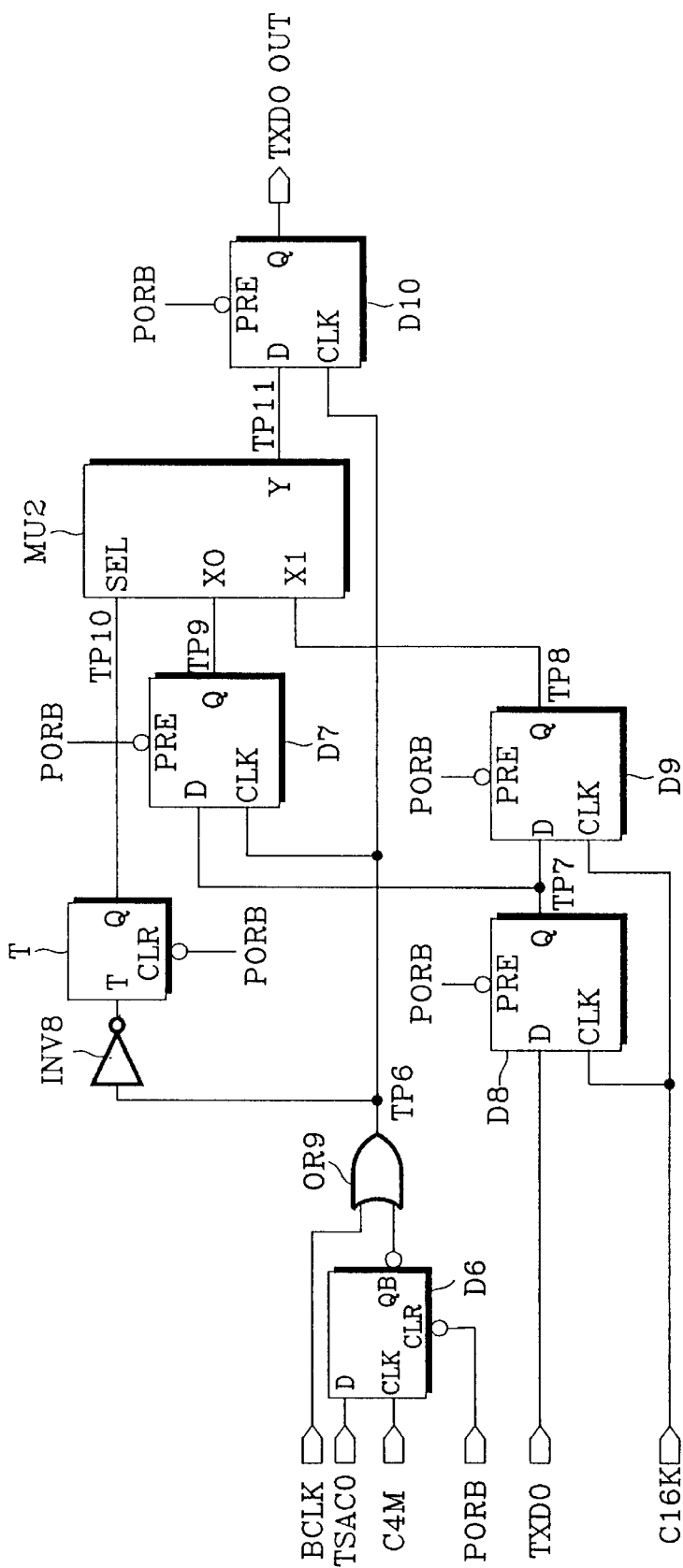
FIG. 9 is a circuit diagram illustrating a transmitting data control unit included in the system shown in FIG. 1.

Referring to FIG. 9, a detailed circuit of the first transmitting data control unit TC0 is illustrated. As mentioned above, the first transmitting data control unit TC0 receives data of "00111011". Now, the procedure of receiving data of "00" at a first frame and compressing the received data for transmission will be described.

First, the first TSAC signal TSAC0 is applied to the input terminal D of a sixth D-flip flop D6 shown in FIG. 9. The power-on reset signal PORB is connected to the clear terminal CLR of the sixth D-flip flop D6. On the other hand, the 4 MHz clock signal C4M is applied to the clock terminal of the sixth D-flip flop D6. The sixth D-flip flop D6 outputs the first TSAC signal TSAC0 at its inverting output terminal QB after delaying the first TSAC signal TSAC0 in accordance with the signal C4M. The inverted output from the sixth D-flip flop D6 is applied to one input terminal of a ninth OR gate OR9 which also receives the signal BCLK at the other input terminal thereof. The ninth OR gate OR9 outputs a low-level signal when both the inverted output from the sixth D-flip flop D6 and the signal BCLK are in a low state. In FIG. 9, the output from the ninth OR gate OR9 is denoted by the reference characters "TP6".

The signal TP6 is a signal which exhibits a low status two times for the first TSAC signal TSAC0. The signal TP6 is applied to a ninth inverter INV8 which, in turn, inverts the signal TP6 and sends it to a T-flip flop T. In response to the inverted signal TP6, the T-flip flop T outputs a signal TP10 which rises at the first positive edge of the signal TP6 and descends at the second positive edge of the signal TP6. The signal TP10 is applied to the selector terminal SEL of a second multiplexer MU2. The signal TP10 is a signal which exhibits a high status for one period of the BCLK signal.

The first transmitting data stream TXD0 is also applied to the input terminal D of an eighth D-flip flop D8. The eighth D-flip flop D8 receives the signal C16K at its clock terminal. Accordingly, the eighth D-flip flop D8 outputs the first transmitting data stream TXD0 at the positive edge of the signal C16K. The output signal from the eighth D-flip flop D8 is denoted by the reference character "TP7". This signal TP7 is applied to a ninth D-flip flop D9.

The ninth D-flip flop D9 also receives the signal C16K at its clock terminal. Accordingly, the ninth D-flip flop D9 outputs the signal TP7 at the positive edge of the signal C16K. In this way, the first transmitting data stream TXD0 is sequentially output while being sequentially delayed in such a manner that one bit of the first transmitting data stream TXD0 is first output by the signal TP7, and the next one bit of the first transmitting data stream TXD0 is then output by the signal TP8.

The signal TP7 is also applied to a seventh D-flip flop D7. The seventh D-flip flop D7 also receives the signal TP6 at its clock terminal. Accordingly, the seventh D-flip flop D7 outputs the signal TP7 at the positive edge of the signal TP6. This output signal from the seventh D-flip flop D7 is denoted by the reference character "TP9".

Meanwhile, the signals TP8 and TP9 are applied to the second multiplexer MU2. The second multiplexer MU2 also receives the signal TP10 at its selector terminal SEL, as mentioned above. Accordingly, the second multiplexer MU2 outputs the signal TP8 when the signal TP10 is in a high state. When the signal TP10 is in a low state, the second multiplexer MU2 outputs the signal TP9.

In this case, the signal TP10 is generated in a high state for one of the bits of the signal BCLK. That is, the signal TP8 is output from the second multiplexer MU2 at the high state of the signal BCLK. Accordingly, the first bit of the first transmitting data stream TXD0 is output. When the signal TP10 is subsequently inverted to a low state, the second bit of the first transmitting data stream TXD0 is output. In other words, the signal TP10 is in its high state at the first bit of the first TSAC signal TSAC0 which is a time slot for the first transmitting data stream TXD0. At the second bit of the first TSAC signal TSAC0, the signal TP10 is in its low state. Therefore, the second multiplexer MU2 outputs the first bit of the first transmitting data stream TXD0 at the high state of the signal TP10 and then outputs the second bit of the first transmitting data stream TXD0 after the signal TP10 is inverted to its low state, but before the signal TP10 is inverted again to its high state in response to the generation of a first TSAC TSAC0 associated with the next frame. The output signal from the second multiplexer MU2 is denoted by the reference character TP11. This signal TP11 is applied to a tenth D-flip flop D10 which also receives the signal TP6 at its clock terminal. Accordingly, the signal TP11 is output from the tenth D-flip flop D10 at the positive edge of the signal TP6. The signal TP11 is the first transmitting data output TXD0 OUT.

Figure 10:
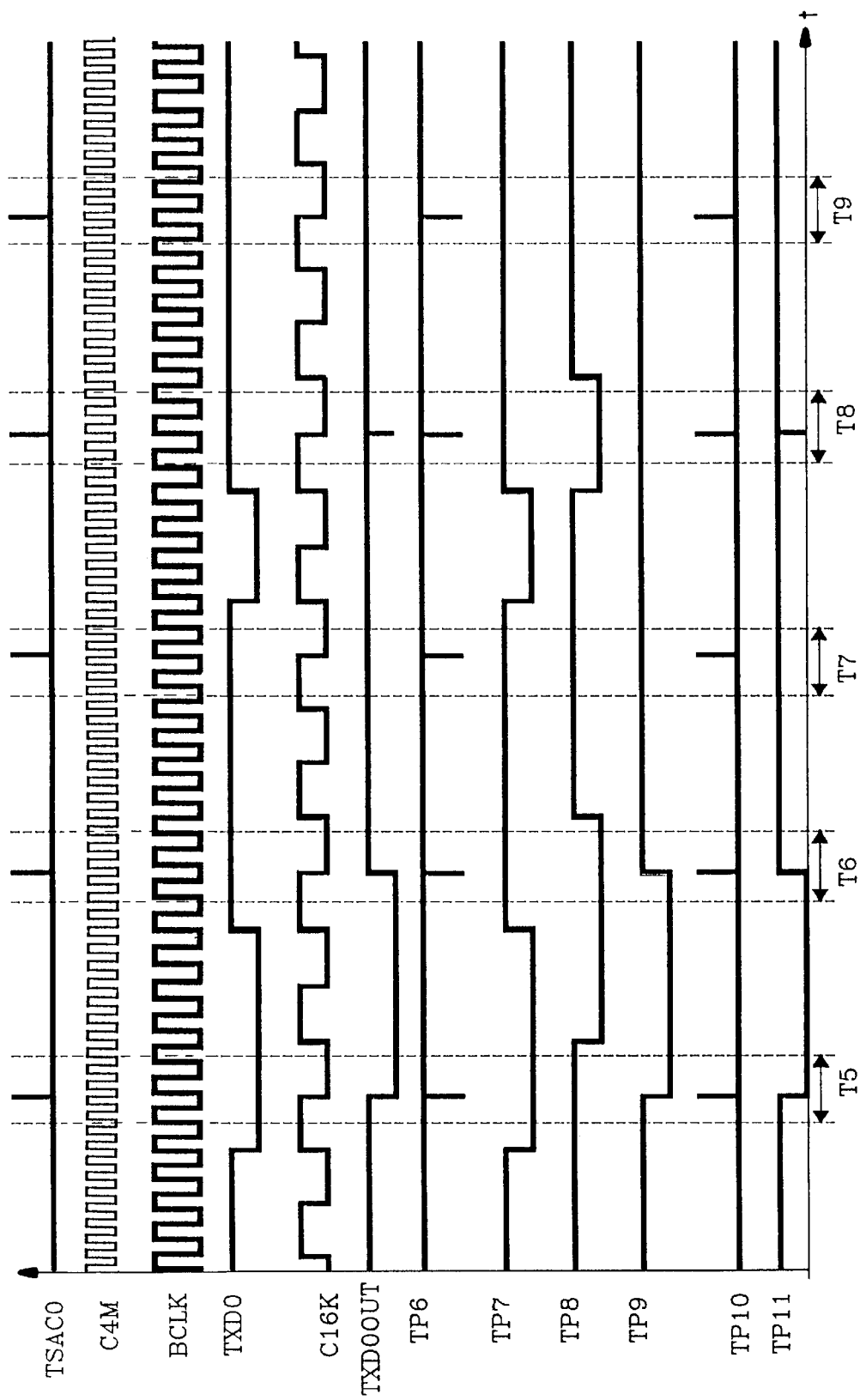
FIG. 10 is a wave form timing diagram illustrating the operation of the transmitting data control unit.

Referring to FIG. 10, an operation timing diagram of the above-mentioned transmitting data control unit TC0 is shown. The operation of the transmitting data control unit TC0 shown in FIG. 10 is associated with the case wherein the first TSAC signal TSAC0 is generated in a low state of the signal C16K. Due to the fact that clock signals C4M and BCLK have frequencies substantially higher than the signals being illustrated in FIG. 10, the portrayal of these two wave forms are not drawn to time scale. For a more precise portrayal of the relative timing of C4M and BCLK to the other wave forms, reference should be made to detail FIGS. 11–15.

In this case, the signal TP6 is generated in a low state at the point of time when the first TSAC signal TSAC0 is generated. The first transmitting data TXD0 is input, for example, in the form of "00111011" at the transmitting data control unit TC0. The signal TP7 corresponds to the transmitting data output at the positive edge of the signal C16K whereas the signal TP8 corresponds to the signal TP7 output at the positive edge of the signal C16K.

Figure 11:
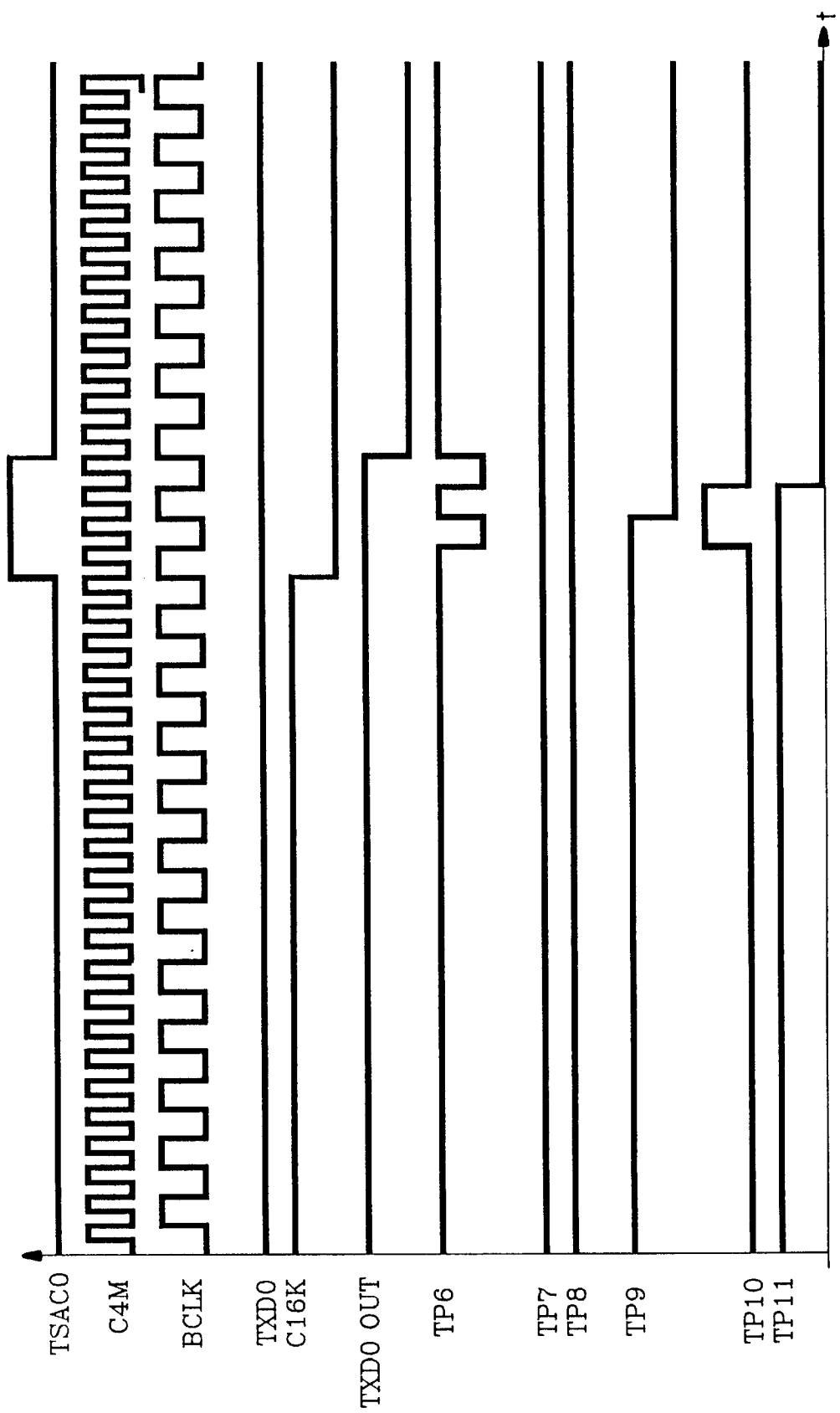
FIG. 11 is a wave form timing diagram showing a detail portion of FIG. 10 corresponding to time period T5, to illustrate the operation of the transmitting data control unit.

Referring to FIG. 11, a portion T5 of the first frame, which is input at the point of time when the first TSAC signal TSAC0 is generated, is shown in detail. The signal TP10 is inverted from its low state to its high state at the first negative edge of the signal TP6 and inverted again from its high state to its low state at the next negative edge of the signal TP6.

In the high state of the signal TP10, the TP11 corresponds to the signal TP8. At this time, the signal TP8 is associated with the previous frame just preceding the first frame. The signal TP9 is output from the point of time when the TP10 is generated in a low state. At this time, the TP9 is in a low state. This signal TP9 corresponds to the first bit, "0", of the first transmitting data. The signal TP11 output at the positive edge of the signal TP6 corresponds to the first transmitting data output TXD0 OUT. In this way, the first and second bits of the first transmitting data output TXD0 OUT are generated at the point of time when the first TSAC signal TSAC0 is generated.

Figure 12:
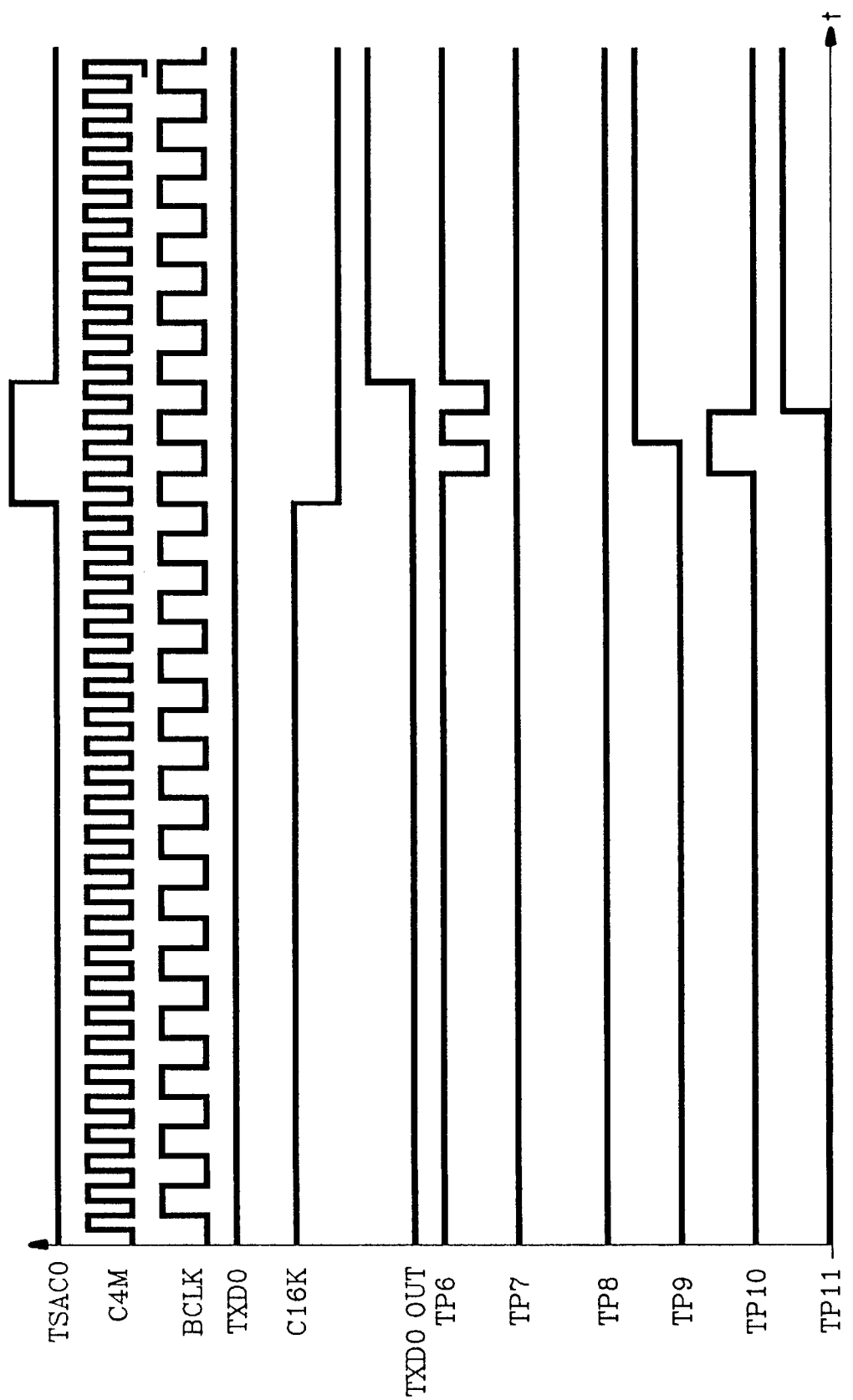
FIG. 12 is a wave form timing diagram showing a detail portion of FIG. 10 corresponding to time period T6, to illustrate the operation of the transmitting data control unit.

Referring to FIG. 12, a portion T6 of the second frame, which is input at the point of time when the first TSAC signal TSAC0 is generated, is shown in detail. In this case, the TP11 corresponds to the signal TP8 in the high state of the signal TP10. At this time, the signal TP8 is indicative of the first bit, "0", of the first frame of the first transmitting data stream TXD0. The signal TP9 is output from the point of time when the TP10 is generated in a low state. At this time, the TP9 is in a low state. This signal TP9 corresponds to the first bit, "0", in the second frame of the first transmitting data stream TXD0. The signal TP11 output at the positive edge of the signal TP6 corresponds to the first transmitting data output TXD0 OUT. In this way, the first and second bits of the first transmitting data output TXD0 OUT are generated at the point of time when the first TSAC signal TSAC0 is generated.

Figure 13:
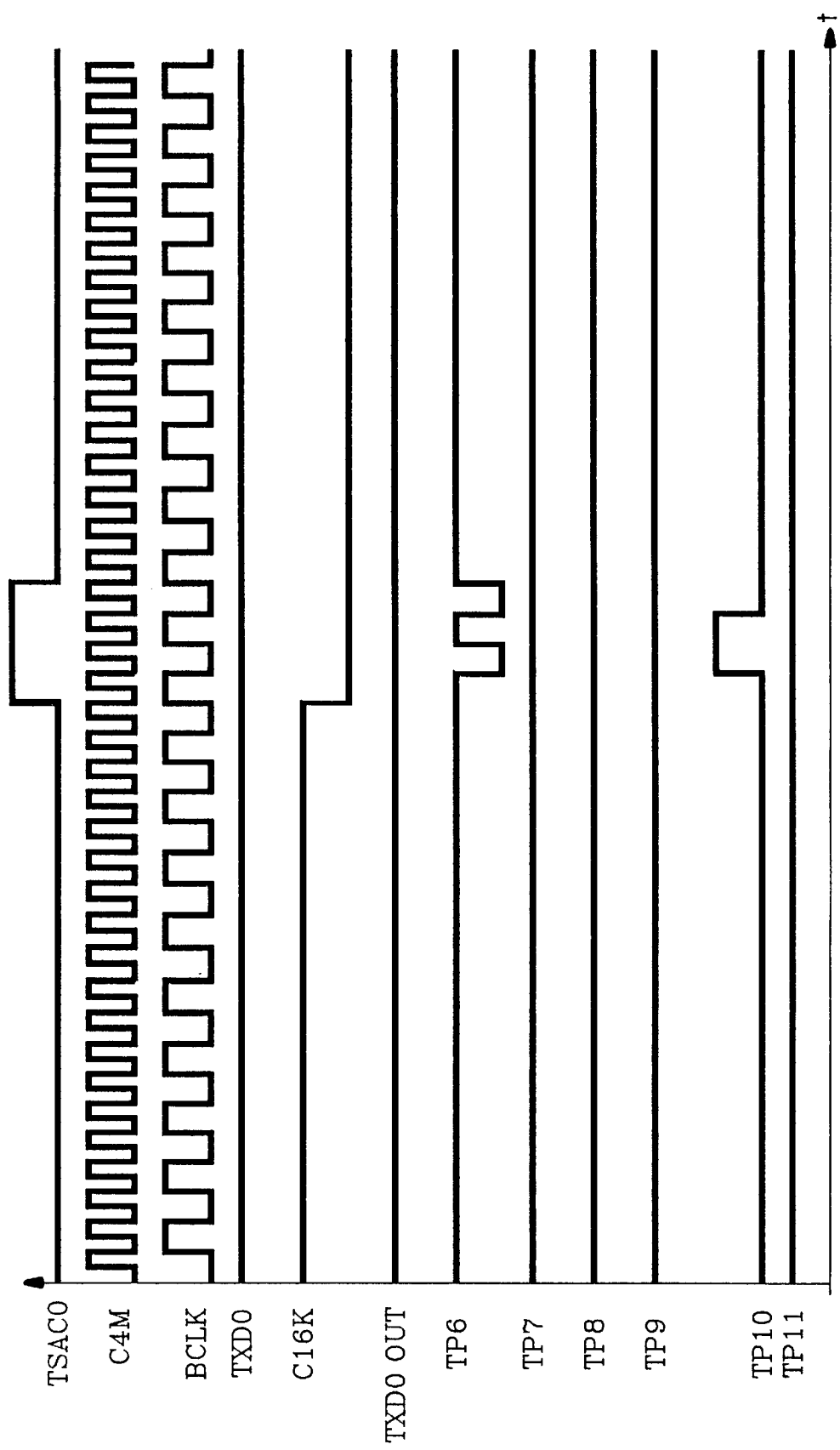
FIG. 13 is a wave form timing diagram showing a detail portion of FIG. 10 corresponding to time period T7, to illustrate the operation of the transmitting data control unit.
Figure 14:
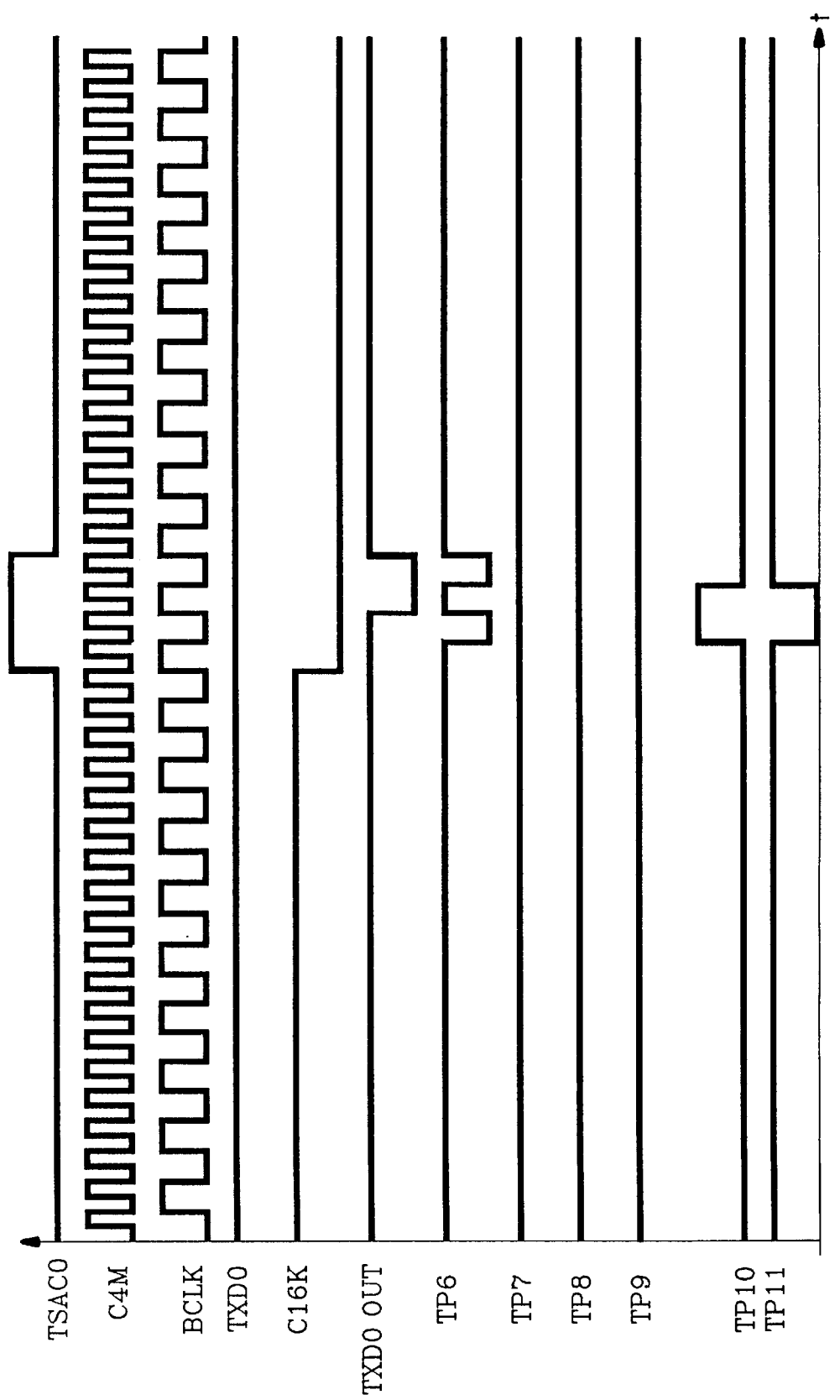
FIG. 14 is a wave form timing diagram showing a detail portion of FIG. 10 corresponding to time period T8, to illustrate the operation of the transmitting data control unit.
Figure 15:
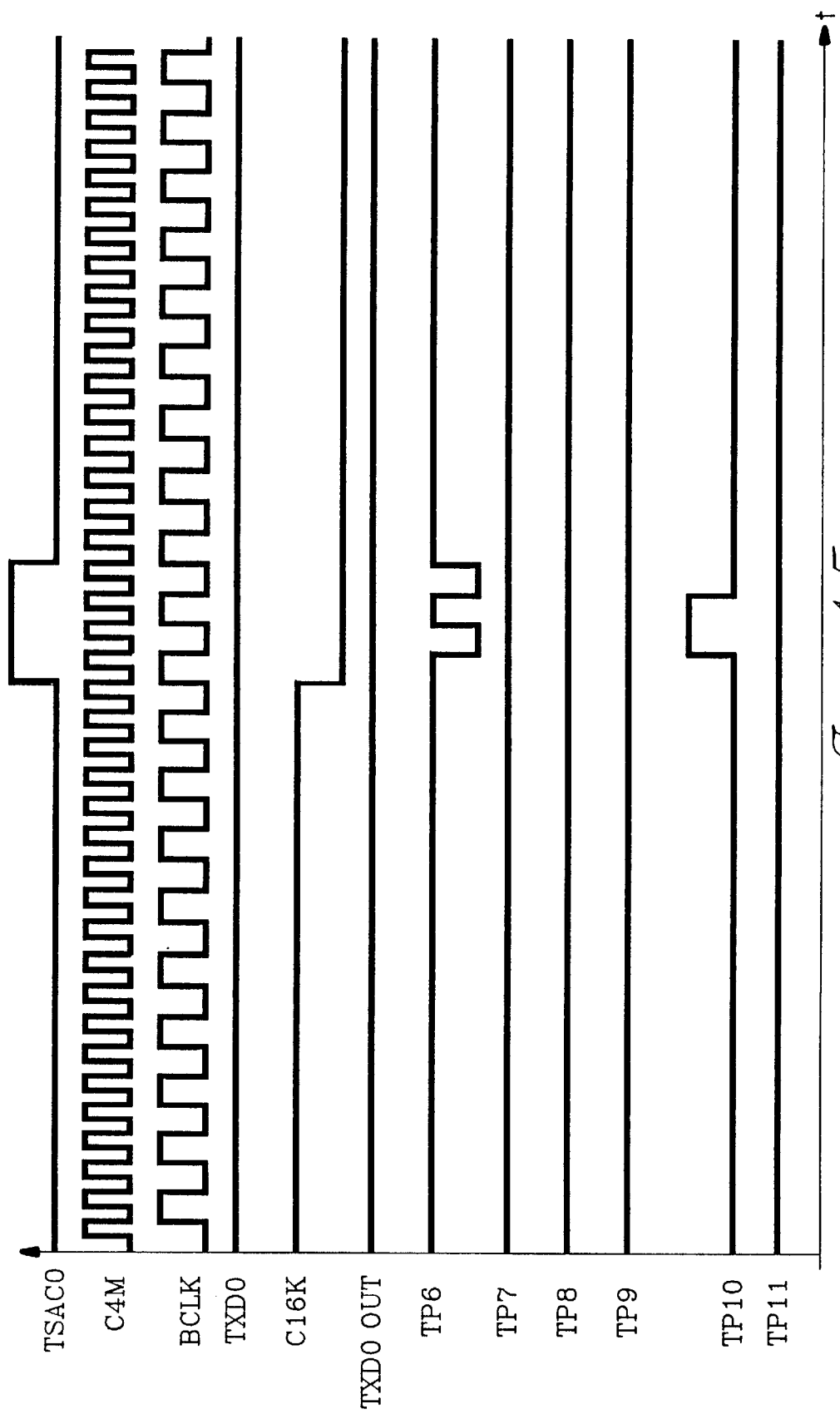
FIG. 15 is a wave form timing diagram showing a detail portion of FIG. 10 corresponding to time period T9, to illustrate the operation of the transmitting data control unit.

Furthermore, FIGS. 13 to 15 show in detail portions of the third to fifth frames, respectively, which are input at the point of time when the first TSAC signal TSAC0 is generated.

Meanwhile, the first to eighth transmitting data outputs TXD0 OUT to TXD7 OUT are applied to the transmitting data coupling unit 14. This transmitting data coupling unit 14 couples the received transmitting data outputs TXD0 OUT to TXD7 OUT into a line which is, in turn, output.

Figure 16:
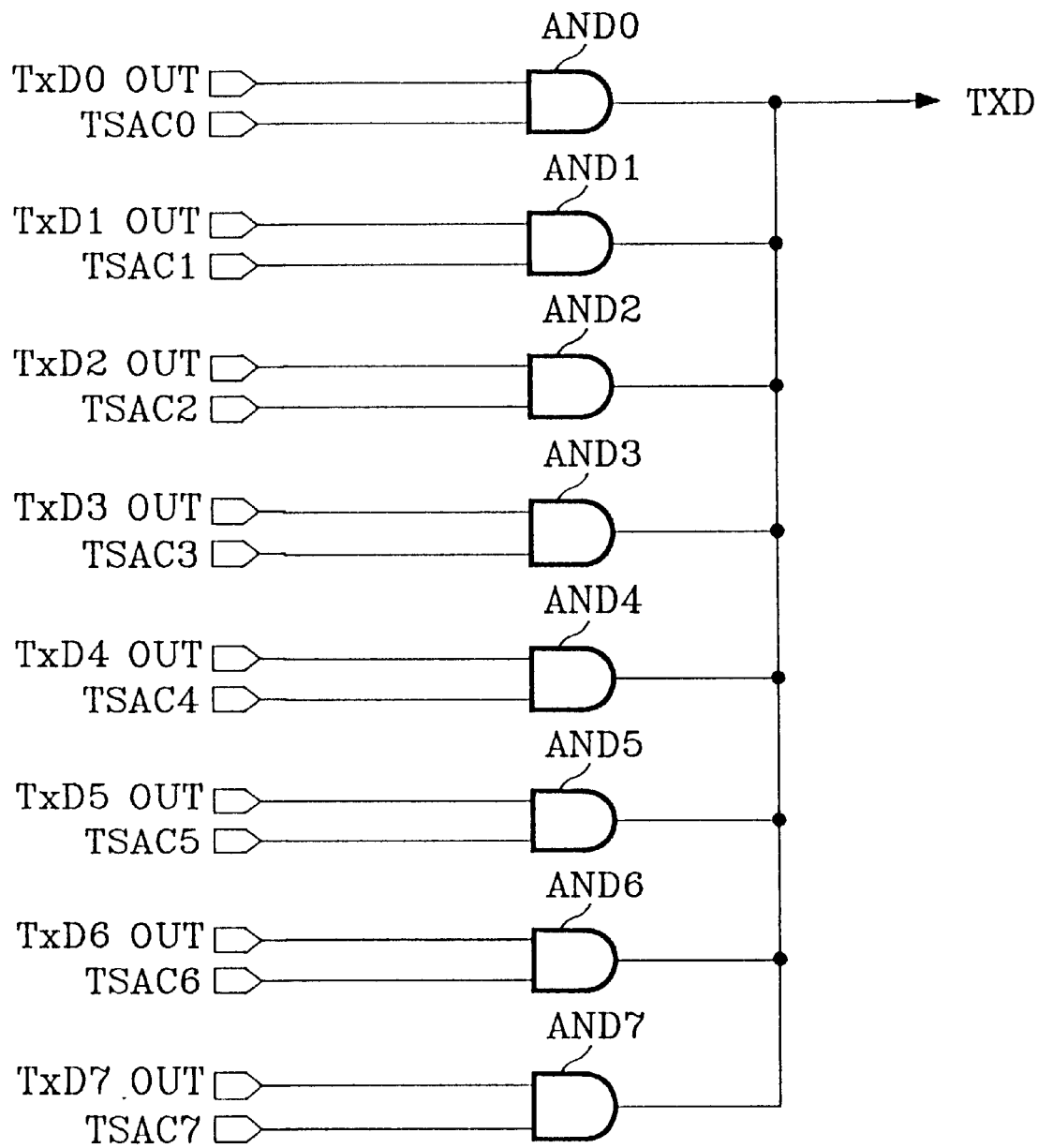
FIG. 16 is a circuit diagram illustrating a transmitting data coupling unit included in the system shown in FIG. 1.

Referring to FIG. 16, a detailed configuration of the transmitting data coupling unit 14 is illustrated. As shown in FIG. 16, the transmitting data coupling unit 14 includes eight AND gates AND0 to AND7. The first AND gate AND0 receives the first transmitting data output TXD0 OUT and the first TSAC signal TSAC0 and outputs a high-level signal when both the received signal are in a high state. The first TSAC signal TSAC0 is in a high state only in its effective time slot and is in a low state otherwise. Accordingly, the output from the first AND gate AND0 corresponds to the status of the first transmitting data output TXD0 OUT exhibited in accordance with the first TSAC signal TSAC0.

On the other hand, the second to eighth AND gates AND1 to AND7 correspond to respective status of the second to eighth transmitting data TXD1 to TXD8 exhibited at corresponding time slots.

The outputs from the first to eighth AND gates AND0 to AND7 are coupled into a line which is, in turn, output as TXD. Since the first to eighth TSAC signals TSAC0 to TSAC7 are generated at different times, respectively, they are coupled into a line which is then externally output along a single transmission line.

As apparent from the above description, the present invention makes it possible to use a single transmitting or receiving line as a time division method is adopted in the case of using a plurality of UART's. Accordingly, the number of external input/output ports is greatly reduced compared to conventional multiple UART systems. In addition, the number of transmission lines is reduced. Therefore, there is an advantage in that the appliance and installation costs are reduced.

Although the preferred embodiments of the invention have been disclosed for illustrative purposes, those skilled in the art will appreciate that various modifications, additions and substitutions are possible, without departing from the scope and spirit of the invention.

What is claimed is:

1. A multi-port universal asynchronous receiver/transmitter system using time division multiplexing, said system comprising:

a plurality of universal asynchronous receiver/transmitter units;

a time slot generating unit for generating time slot signals corresponding in number to said plurality of universal asynchronous receiver/transmitter units;

a receiving data separating unit for separating receiving data into a plurality of receiving data streams which correspond to the time slot signals; and a plurality of receiving data control units, each of said receiving data control units receiving one of said receiving data streams and time expanding data in the respective receiving data stream;

wherein each of said universal asynchronous receiver/transmitter units being connected to receive the time expanded data from a respective one of the receiving data control units and then transfer the time expanded data to an appliance, and each of said universal asynchronous receiver/transmitter units connected to receive transmitting data from the appliance to be output;

said system further comprising:

a plurality of transmitting data control units, each of said plurality of transmitting data control units receiving the transmitting data output from the universal asynchronous receiver/transmitter units and time compressing portions of the received transmitting data to correspond to a respective one of said time slot signals; and a transmitting data coupling unit for receiving time compressed transmitting data from each of said plurality of transmitting data control units and coupling the time compressed transmitting data, received from said plurality of transmitting data control units, into a single data line.

2. The multi-port universal asynchronous receiver/transmitter system in accordance with claim 1, wherein the receiving data separating unit comprises:

a plurality of inverters, each of said inverters receiving a respective one of said time slot signals, the inverters serving to invert the time slot signals; and a plurality of logic gates, each of said logic gates receiving, at a first input, an output from a respective one of said plurality of inverters and receiving, at a second input, the receiving data, wherein the receiving data is separated in accordance with the time slot signals.

3. The multi-port universal asynchronous receiver/transmitter system in accordance with claim 1, wherein each one of said receiving data control units time expands the data in a respective receiving data stream so that the receiving data associated with each time slot signal are transformed to be in a form processable by the respective universal asynchronous receiver/transmitter units.

4. The multi-port universal asynchronous receiver/transmitter system in accordance with claim 3, wherein the receiving data control units each comprise:

a latch unit for latching the data in the respective receiving data stream during the corresponding time slot signal; and a receiving data output unit for receiving from the latch unit the the data in the respective data stream which is latched in the latch unit, transforming that data in such a manner that the data is processible in the respective universal asynchronous receiver/transmitter unit, and then outputting the transformed data sequentially.

5. The multi-port universal asynchronous receiver/transmitter system in accordance with claim 4, wherein the latch unit comprises:

a first latch for latching the respective time slot signal, inverting the received time slot signal, and outputting the inverted time slot signal after delaying it;

a logic gate for outputting a clock signal when said first latch outputs a signal indicative of the respective time slot;

a second latch for receiving the output from the logic gate and outputting the data in the respective receiving data stream in accordance with the output from the logic gate; and a third latch for receiving the output from the logic gate and outputting the output from the second latch in accordance with the output from the logic gate.

* * * * *